United States Patent
Duan et al.

(10) Patent No.: US 11,198,230 B2
(45) Date of Patent: Dec. 14, 2021

(54) USE OF AQUEOUS DISPERSION OF SILOXANE FOR REDUCING GRAIN PUFFING OF WOOD SUBSTRATE AND ARTICLE COMPRISING ANTI-GRAIN PUFFING COATING

(71) Applicant: SWIMC LLC, Cleveland, OH (US)

(72) Inventors: Gang Duan, Chicago, IL (US); Shigang Fan, Foshan (CN)

(73) Assignee: SWIMC LLC, Cleveland, OH (US)

( * ) Notice: Subject to any disclaimer, the term of this patent is extended or adjusted under 35 U.S.C. 154(b) by 156 days.

(21) Appl. No.: 16/506,016

(22) PCT Filed: Jan. 11, 2018

(86) PCT No.: PCT/US2018/013279
§ 371 (c)(1),
(2) Date: Jul. 9, 2019

(87) PCT Pub. No.: WO2018/132545
PCT Pub. Date: Jul. 19, 2018

(65) Prior Publication Data
US 2019/0366582 A1   Dec. 5, 2019

(30) Foreign Application Priority Data

Jan. 11, 2017 (CN) .......................... 201710020650.6

(51) Int. Cl.
| | | |
|---|---|---|
| *B27K 3/00* | (2006.01) | |
| *B05D 7/00* | (2006.01) | |
| *B27K 3/15* | (2006.01) | |
| *B27K 3/34* | (2006.01) | |
| *C08F 16/06* | (2006.01) | |
| *C08G 77/16* | (2006.01) | |
| *C08G 77/18* | (2006.01) | |
| *C08G 77/26* | (2006.01) | |
| *C08G 77/28* | (2006.01) | |
| *C08G 77/30* | (2006.01) | |
| *C09D 183/06* | (2006.01) | |

(52) U.S. Cl.
CPC ............... B27K 3/007 (2013.01); B05D 7/50 (2013.01); B27K 3/15 (2013.01); B27K 3/34 (2013.01); C08F 16/06 (2013.01); C08G 77/16 (2013.01); C08G 77/18 (2013.01); C08G 77/26 (2013.01); C08G 77/28 (2013.01); C08G 77/30 (2013.01); C09D 183/06 (2013.01); *B05D 2401/20* (2013.01); *B05D 2518/10* (2013.01); *C08F 2500/17* (2013.01)

(58) Field of Classification Search
CPC ............................. B32B 27/283; B32B 21/08
USPC .................... 524/837; 428/452; 106/287.12
See application file for complete search history.

(56) References Cited

U.S. PATENT DOCUMENTS

| | | | |
|---|---|---|---|
| 4,913,972 A * | 4/1990 | Grunewalder | ........... B05D 7/08 427/303 |
| 6,294,608 B1 | 9/2001 | Hager et al. | |
| 6,491,838 B1 | 12/2002 | Standke et al. | |
| 6,887,527 B2 * | 5/2005 | Matsumura | .............. B05D 7/08 427/408 |
| 6,916,507 B2 | 7/2005 | Matsumura et al. | |
| 6,924,608 B2 | 8/2005 | Czernichowski et al. | |
| 2009/0169875 A1 * | 7/2009 | Endo | ...................... C08G 77/58 428/336 |
| 2012/0027933 A1 * | 2/2012 | Zheng | ...................... B05D 5/10 427/164 |

FOREIGN PATENT DOCUMENTS

| | | |
|---|---|---|
| CN | 101720341 | 6/2010 |
| CN | 101815757 | 8/2010 |
| CN | 102190936 | 9/2011 |
| CN | 101905471 | 5/2012 |
| CN | 102492342 | 6/2012 |
| EP | 1191143 | 3/2002 |
| EP | 2213697 | 8/2010 |
| WO | 9308006 | 4/1993 |
| WO | WO 93/08006 * | 4/1993 |
| WO | 199523830 | 9/1995 |
| WO | 199723432 | 7/1997 |

OTHER PUBLICATIONS

Product data sheet for Dynasylan Hydrosil 2627 (no date).*
"How is Plywood Made?" Curtis Lumber & Plywood (Jul. 2019).*
PCT International Search Report, dated Mar. 29, 2018.
PCT Written Opinion of the International Searching Authority, dated Mar. 29, 2018.
Extended European Search Report for corresponding appl. No. 18739416.8, dated Jul. 31, 2020 (6 pages).

* cited by examiner

*Primary Examiner* — Marc S Zimmer

(57) ABSTRACT

The present disclosure relates to use of an aqueous dispersion of siloxane for reducing grain puffing of a wood substrate and an article comprising an anti grain puffing coating. The article comprises (a) a wood substrate having at least one major surface; (b) an anti grain puffing coating directly applied on the major surface of the wood substrate, formed from an aqueous dispersion of siloxane; and (c) one or more coatings applied on the anti grain puffing coating, formed from an aqueous coating composition, wherein the siloxane contains one or more hydrophobic group and one or more hydrophilic group chemically bonded to its molecule skeleton; and wherein the siloxane has a particle size in the range of 5 to 100 nm.

12 Claims, No Drawings

USE OF AQUEOUS DISPERSION OF SILOXANE FOR REDUCING GRAIN PUFFING OF WOOD SUBSTRATE AND ARTICLE COMPRISING ANTI-GRAIN PUFFING COATING

CROSS REFERENCE TO RELATED APPLICATION

This application is a national stage entry under 35 U.S.C. § 371 of PCT Application No.: PCT/US2018/013279, filed Jan. 11, 2018, which claims the benefit of Chinese Application No.: CN2017100206506, filed on Jan. 11, 2017, each of which is incorporated herein by reference in its entirety.

TECHNICAL FIELD

The present disclosure relates to use of aqueous dispersion of siloxane for reducing grain puffing of wood substrate and article comprising an anti-grain puffing coating.

BACKGROUND

Waterborne paints usually contain water instead of organic solvents as a diluent medium, the production, storage and use of which would necessarily reduce the release of organic solvents into the environment, avoid environmental pollution and harm to the construction workers, and also save resources. Thus, with the increasingly stringent environmental laws and regulations in various countries in the world, waterborne coatings have become the main direction for the development of coatings industry. The use of waterborne wood coatings may not only meet the sustainable development of energy-saving emission reduction requirements, but also reduce indoor pollution. Therefore, development of high-performance waterborne coatings have become a key point in the coatings industry.

Wood products, including wood furniture are the most commonly used products in industry and life, which are mainly made of wood substrate with capillary porous structure on the surface thereof. Before painting, in order to achieve a smooth surface, it is usually necessary to polish the wood substrate first. However, this procedure inevitably results in the presence of a large amount of loosely bound wood fibers on the surface of the wood substrate. When the treated substrate is applied with waterborne wood lacquer, water easily penetrates into capillaries of the substrate, causing the capillaries to swell, and the loosely bound fibers will protrude over the treated surface to create a bumpy coating called a "grain puffing" phenomenon. The existence of this phenomenon will significantly reduce the decorative effect of the coating.

Currently, two conventional methods for reducing or eliminating the "grain puffing" problem comprise 1) to coat the wood substrate with a solvent-based wood sealer followed by a water-based wood coating; or 2) to coat the wood substrate with an aqueous wood lacquer containing ethanol/acetone as solvent, both of which may achieve acceptable grain puffing resistance with unacceptable VOC contamination. In addition, spraying XK-350 cationic waterborne paint from DSM on some wood substrates is also an option to reduce or eliminate the "grain puffing" phenomenon. However, this water-based latex paint is expensive, has limited application areas, and exhibits inferior performance to the above two conventional methods.

Thus, there is still a need to reduce or eliminate "grain puffing" phenomenon of the wood substrate.

SUMMARY

In one aspect, the present disclosure discloses an article, comprising (a) a wood substrate having at least one major surface; (b) an anti grain puffing coating directly applied on the major surface of the wood substrate, formed from an aqueous dispersion of siloxane; and (c) one or more coatings applied on the anti grain puffing coating, formed from an aqueous coating composition, wherein the siloxane contains one or more hydrophobic groups and one or more hydrophilic groups chemically bonded to its molecule skeleton; and wherein the siloxane has a particle size in the range of 5 to 100 rm. Preferably, the article has a surface roughness that is less than the surface roughness it has without the anti grain puffing coating by 50% or more.

In another aspect, the present disclosure discloses a method for reducing grain puffing of a wood substrate, comprising the step of directly applying an aqueous dispersion of siloxane to at least one major surface of the wood substrate, wherein the siloxane contains one or more hydrophobic groups and one or more hydrophilic groups chemically bonded to its molecule skeleton; and wherein the siloxane has a particle size in the range of 5 to 100 nm.

In another aspect, the present disclosure discloses use of an aqueous dispersion of siloxane for reducing grain puffing of a wood substrate, wherein the siloxane contains one or more hydrophobic groups and one or more hydrophilic groups chemically bonded to its molecule skeleton; and wherein the siloxane has a particle size in the range of 5 to 100 nm.

In an embodiment of the present disclosure, the siloxane has the following structure ("Structure 1"):

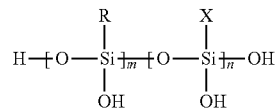

in which
R represents independently, at each occurrence, optionally substituted $C_1$-$C_{20}$ alkyl or $C_6$-$C_{10}$ aryl;
X represents independently, at each occurrence, a hydrophilic group;
m is an integer of greater than or equal to 1 and less than 50,
n is an integer of greater than or equal to 1 and less than 50, and
the sum of m and n is an integer of greater than or equal to 2.

In one embodiment of the present invention, the siloxane comprises a mixture of siloxane molecules of structure 1 and the mixture has a ratio of m to n is in the range of 0.8:1 to 1.2:1.

In the present invention, applicants have creatively provided a novel idea for solving the issue of grain puffing by applying an aqueous dispersion of siloxane containing hydrophilic groups and hydrophobic groups and having a smaller particle size (e.g., less than 100 nanometers) to the surface of a wood substrate as an anti-grain puffing coating. The formation of this anti-grain puffing coating significantly reduces or eliminates grain puffing of the wood substrate caused by the aqueous coating composition, which was never realized before the present invention.

It is well-known that the introduction of hydrophilic groups to coating is one of the effective methods for improving the permeability of aqueous medium into the coating. However, this treatment often adversely reduces the barrier properties of the coating against aqueous coating composition subsequently applied thereto, resulting in easier penetration of aqueous medium through the coating, even into the underlying wood substrate. However, it has been surprisingly found that introduction of hydrophilic functional groups to siloxane that is used to form the anti grain puffing coating not only does not impair its anti-grain puffing effect but also enhances the adhesion of the anti-grain puffing coating to the subsequent coating formed thereon from an aqueous coating composition, which was anticipated prior to the present invention. The inventors of the present disclosure more surprisingly found that the best grain puffing resistance can be achieved when the hydrophilicity and hydrophobicity of siloxane reach a specific balance.

The details of one or more embodiments of the invention will be set forth in description below. The other features, objectives, and advantages of the invention will become apparent.

Definition

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of wood substrates, the term "major surface" is a surface defined by the lengthwise and widthwise dimensions of the wood substrates for providing the decoration.

Herein, the term "surface roughness" is a parameter used for measuring the extent to which a wood substrate is penetrated by an aqueous coating composition. The smaller the surface roughness indicates that the wood substrate exhibits lower grain puffing.

The term "on" when used in the context of "a coating applied on an anti-grain puffing coating, formed from an aqueous coating composition" includes the coating being applied directly or indirectly on the anti-grain puffing coating. In some embodiments of the invention, the coating formed from the aqueous coating composition is applied directly to the anti-grain puffing coating and is in direct contact with the anti-grain puffing coating. In some embodiments of the invention, one or more layers of colorant may be present between the coating formed from the aqueous coating composition and the anti-grain puffing coating so as to achieve the desired color.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

In one aspect, the present disclosure discloses an article, comprising (a) a wood substrate having at least one major surface; (b) an anti grain puffing coating directly applied on the major surface of the wood substrate, formed from an aqueous dispersion of siloxane; and (c) one or more coatings applied on the anti grain puffing coating, formed from an aqueous coating composition, wherein the siloxane contains one or more hydrophobic groups and one or more hydrophilic groups chemically bonded to its molecule skeleton; and wherein the siloxane has a particle size in the range of 5 to 100 nm.

Preferably, the article according to the present disclosure has a smooth surface, the surface roughness of which is less than the surface roughness it has without the anti grain puffing coating by 50% or more, preferably 55% or more, more preferably 60% or more.

Wood Substrate

As the wood substrate used to make the article of the present disclosure, any suitable wood substrate known in the art can be used. According to the invention, the wood substrate has at least one, preferably two, major surfaces that are opposite one another. As used herein, "major surface" is a surface defined by the lengthwise and widthwise dimensions of the wood substrate for providing the decoration.

Preferably, the major surface of the wood substrate may contain polar groups such as hydroxyl groups, amino groups, mercapto groups, etc., so that the aqueous dispersion of siloxane according to the present disclosure can easily wet the major surface when it is applied thereto. Furthermore, the hydroxyl groups may undergo a bonding reaction with the silanol groups optionally present on the siloxane contained in the aqueous dispersion to form a hard film. Methods for obtaining a wood substrate having a major surface with hydroxyl groups are known in the art. Specifically, the hydroxyl group may be introduced on the surface of the wood substrate by performing surface treatment on the major surface of the wood substrate, for example, by corona treatment.

According to the present disclosure, the wood substrate comprises a soft wood substrate, a hard wood substrate or a combination thereof. As an example of a soft wood substrate, pine, cedar or fir can be used. As an example of a hard wood substrate, ashtree, white ash, basswood, elm, maple, birch, alder, beech, oak, rubber wood, cherry, walnut, or rosewood can be used. In one embodiment of the present disclosure, solid oak board is used as the wood substrate.

Anti-Grain Puffing Coating

In the article according to the present disclosure, an anti-grain puffing coating is applied directly onto the major surface of the wood substrate, which is formed from an aqueous dispersion of siloxane. According to the present disclosure, an aqueous dispersion of siloxane refers to a dispersion of siloxane in an aqueous solvent including water, a water-miscible solvent, or a combination thereof, preferably in water, which is free of volatile organic components.

According to the present disclosure, siloxane present in the aqueous dispersion refers to a polymer comprising a —Si—O— structural unit in the molecular skeleton thereof, which polymer further comprises one or more hydrophobic groups and one or more hydrophilic groups chemically bonded to the molecular skeleton thereof. Further, the siloxane may further comprise one or more silanol groups.

According to the present disclosure, "hydrophobic group" refers to an atom or group of atoms that is almost neither of water-affinity nor of water-solubility. Common hydrophobic groups include, but are not limited to, $C_1$-$C_{20}$ hydrocarbyls, including alkyl or aryl groups. In an embodiment of the present disclosure, the hydrophobic group includes a $C_1$-$C_{20}$ alkyl group or a $C_6$-$C_{10}$ aryl group. As examples of hydrophobic groups, methyl, ethyl, propyl, butyl, pentyl, hexyl, heptyl, octyl, nonyl, decyl, undecyl, dodecyl, tridecyl, tetradecyl, pentadecyl, hexadecyl, octadecyl, and eicosyl groups, preferably substituted by halogen, more preferably by fluorine. It has been found that the incorporation of the above hydrophobic groups into the siloxane can block the penetration of water from the aqueous coating composition which is subsequently applied to the anti-grain puffing coating into the underlying wood substrate.

According to the present disclosure, "hydrophilic group" refers to an atom or group of atoms which is soluble in water or easily miscible with water, and the solid surface having the group is easily soaked by water. In an embodiment of the present disclosure, the hydrophilic group comprises an amino functional group or an acid functional group. As examples of acid functional groups, carboxylic acids, sulfuric acid, phosphoric acid, sulfonic acid, phosphorous acid, phosphonic acid or its salt groups can be used. In one embodiment of the present invention, the hydrophilic group is selected from the group consisting of amino $C_{1-8}$ alkyl groups and carboxy $C_{1-8}$ alkyl groups. It has been observed that the incorporation of hydrophilic groups into the siloxane can increase the adhesion of the coating formed therefrom to the coating formed thereon by the aqueous coating composition without substantially impairing the grain puffing resistance of the anti-grain puffing coating, which is unpredictable prior to the present disclosure.

According to the present disclosure, "silanol group" refers to a functional group having a —Si—OH structure. The presence of this group allows siloxane to crosslink themselves or react with other functional groups such as hydroxyl groups, amino groups and the like. In an embodiment of the present disclosure, the silanol group can react with hydroxyl functional groups on the wood substrate to form a hard coating.

In the aqueous dispersion of the present disclosure, the siloxane particles have a particle size of not more than 100 nm, preferably not more than 90 nm, more preferably not more than 80 nm, still more preferably not more than 60 nm. Starting from practical applications, the siloxane particles are required to have a particle size of at least 5 nm, preferably at least 10 nm, more preferably 20 nm. In an embodiment of the present disclosure, the particle size of siloxane particles is in the range of 5-40 nm, which particle size can be determined by light scattering. It has been observed that the above-mentioned range of particle sizes results in the siloxane particles readily penetrating into the texture of the wood substrate and clogging pores, thereby reducing grain puffing of the wood substrate. If the particle size is too small, the siloxane polymer particles cannot effectively block the texture and/or pores of the wood substrate, and if the particle size is too big, the siloxane particles cannot enter the pores of the wood substrate and thus cannot achieve grain puffing resistance effect.

Preferably, the aqueous dispersions of siloxane suitable for use in the present disclosure have a lower viscosity. In one embodiment of the invention, the aqueous dispersion of siloxane has a viscosity of 100 mPa·s or less at 25° C., preferably a viscosity of 50 mPa·s or less at 25° C., and more Preferably has a viscosity of 30 mPa·s or less at 25° C., still more preferably has a viscosity of 20 mPa·s or less at 25° C. It has been observed that the aqueous dispersion of siloxane with a lower viscosity can more easily penetrate into the pores and textures of the wood substrate thereby forming a substantially complete protective layer on the surface of the wood substrate.

In an embodiment of the invention, the siloxane has the following structure (Structure 1):

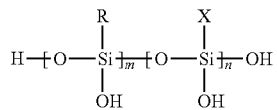

in which R represents independently, at each occurrence, optionally substituted C1-C20 alkyl or C6-C10 aryl;

X represents independently, at each occurrence, a hydrophilic group;

m is an integer of greater than or equal to 1 and less than 50, n is an integer of greater than or equal to 1 and less than 50, and the sum of m and n is an integer of greater than or equal to 2.

Preferably, the siloxane comprises a mixture of siloxane molecules of structure 1, and the mixture has a ratio of m to n in the range of 0.8:1 to 1.2:1, preferably having a ratio in the range of 0.9:1 to 1.1:1, even more preferably having a ratio in the range of 0.95:1 to 1.05:1, even more preferably having a ratio in the range of 0.98:1 to 1.02:1. It has been observed that siloxane having the above ratio have a balanced hydrophilicity and hydrophobicity and that aqueous dispersions containing such siloxane can obtain particularly advantageous grain puffing resistance.

The aqueous dispersions of siloxane can be prepared using suitable methods well known to those skilled in the art, for example by condensation of silane compounds by the gel-sol method. Alternatively, any suitable commercially available product can be used, such as Siloxane dispersions from Evonik of Germany such as Dynasylan® Hydrosil 2627, Hydrosil 2776, Hydrosil 2909, SIVO 112.

According to the invention, the aqueous dispersions of siloxane can be applied by customary application processes known to a person skilled in the art. The application processes comprise dip coating, spin coating, spray coating, curtain coating, brush coating, roll coating, and other coating methods known in the art. In one embodiment of the present disclosure, application is carried out by spray coating.

Coating Formed from an Aqueous Coating Composition

In the article according to the present disclosure, one or more coatings formed from an aqueous coating composition may be applied to the surface of the anti-grain puffing coating. According to the present invention, the coating may comprise a primer coating, an intermediate coating, a topcoat coating, or a combination thereof. The coating can be applied directly to the anti-grain puffing coating and is in contact with the anti-grain puffing coating. In some embodiments of the invention, one or more colorant layers may be present between the coating formed from the aqueous coating composition and the anti-grain puffing coating so as to achieve the desired color.

According to the present invention, two or more coatings formed from the aqueous coating composition may be applied to the anti-grain puffing coating, preferably three or more coatings formed from the aqueous coating composition, and more preferably, 4 or more coating formed from the aqueous coating composition without affecting the barrier effect of the anti-grain puffing coating.

According to the present invention, the aqueous coating composition may be any aqueous coating composition known to those skilled in the art that is suitable for coating wood substrates. In one embodiment of the invention, the aqueous coating composition is a water-soluble coating, preferably comprising polyvinyl alcohol as the film-forming resin. In another embodiment of the present invention, the aqueous coating composition is a water-dispersible coating, preferably comprising a film-forming resin including, but not limited to, an aqueous dispersion of organic silicone, an aqueous dispersion of styrene-acrylate, an aqueous dispersion of acrylate, an aqueous dispersion of organic silicone-modified acrylate, an aqueous dispersion of vinyl acetate, an aqueous dispersion of vinyl acetate-acrylate, an aqueous dispersion of vinyl acetate-ethylene, an aqueous dispersion of vinyl acetate-acrylate-esters of versatic acid, an aqueous dispersion of polyurethane, an aqueous dispersion of acrylate-polyurethane or any combination thereof.

The aqueous coating composition of the present disclosure may further comprise one or more fillers. As used herein, the term, "filler", is intended to refer to any coating volume extender, either organic or inorganic, in the form of e.g., particles or powders. There is no particular limitation on the shape of particles, and the filler may have any suitable shape, for example, sphere, ellipsoid, pellet, or other irregular shapes. The particle size of the filler may vary over a broad range, e.g., from about 10 nanometers to about 50 micrometers. In addition to functioning as a coating volume extender, some fillers may impart one or more desired properties to the composition and/or coating resulted from the composition. For example, some fillers may impart desired color to the composition and hence the coating resulted from the composition, and in this case such fillers may be also referred to as "pigment". Some fillers may improve chemical and/or physical properties, in particular mechanical properties of the coating resulted from the composition, and in this case they may also be referred to as "enforcing additive".

The present aqueous coating composition may optionally include additional additives for an aqueous coating composition which do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, pigments, anti-migration aids, anti-microbials, extenders, lubricants, wetting agents, biocides, plasticizers, antifoaming agents, colorants, waxes, anti-oxidants, anticorrosion agents, flow control agents, thixotropic agents, dispersants, adhesion promoters, UV stabilizers, a thickener, a defoamer, a pH adjuster, a silane coupling agent, a high boiling film forming agent, or combinations thereof. Each optional ingredient can be included in a sufficient amount to serve its intended purpose, but preferably not in such an amount to adversely affect a coating composition or a cured coating resulting therefrom.

According to the present invention, the preparation of the aqueous coating composition can be accomplished using any suitable method known to one of ordinary skill in the art. For example, the aqueous coating composition can be made by adding all of the components to a container and then stirring the resulting mixture until homogeneous. Alternatively, the aqueous coating composition can be made by first mixing some of the components and then adding the rest of the other components to form a homogeneous mixture. Alternatively, any suitable commercially available aqueous coating composition may be used, such as an acrylic aqueous sealant and/or varnish from Valsper (China), such as 470C4015K, 481C54086K.

According to the present invention, the aqueous coating composition can be applied by conventional application processes known to those skilled in the art. The application processes include dip coating, spin coating, spray coating, curtain coating, brush coating, roll coating, and other application processes known in the art. According to the present invention, a wet on dry application process is applied. Typically, an aqueous liquid medium comprising water and any co-solvent is removed by natural or accelerated (heat) drying to form a coating.

According to the present invention, the article can be prepared, for example, by (1) providing a milled wooden substrate; (2) applying an aqueous dispersion of a siloxane of the present disclosure to the wood substrate using a spray coating process, thereby forming an anti grain puffing coating; and (3) sequentially applying one or more desired coatings formed from the aqueous coating composition to the anti grain puffing coating using a wet-on-dry coating process. Optionally, the colorant may be coated on the anti-grain puffing coating prior to step (3) so as to provide the wood substrate with the desired color.

According to the present invention, articles thus obtained may be used for applications including, but not limited to, household furniture such as tables, chairs, cabinets and the like; bedroom and bathroom furniture; office furniture; custom furniture such as school and children's furniture, hospital furniture, restaurant and hotel furniture, kitchen cabinets and furniture; interior design panels; indoor and outdoor windows and doors; indoor and outdoor window and door frames; outdoor and indoor wall panels and wood floors.

In another aspect, the present disclosure discloses a method for reducing grain puffing of a wood substrate, comprising the step of directly applying an aqueous dispersion of siloxane to at least one major surface of the wood substrate, wherein the siloxane contains one or more hydrophobic groups and one or more hydrophilic groups chemically bonded to its molecule skeleton; and wherein the siloxane has a particle size in the range of 5 to 100 nm. Preferably, the siloxane further comprises one or more silanol groups. More preferably, the aqueous dispersion has a viscosity of 100 mPa·s or less at 25° C.

In an embodiment of the invention, the siloxane has the following structure (Structure 1):

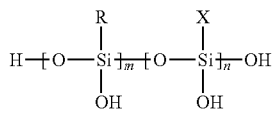

in which
R represents independently, at each occurrence, optionally substituted C1-C20 alkyl or C6-C10 aryl;
X represents independently, at each occurrence, a hydrophilic group;
m is an integer of greater than or equal to 1 and less than 50,
n is an integer of greater than or equal to 1 and less than 50, and
the sum of m and n is an integer of greater than or equal to 2.

In the present invention, applicants have creatively proposed to apply an aqueous dispersion of siloxane containing hydrophilic groups and hydrophobic groups and having a smaller particle size (e.g., less than 100 nanometers) to at least one, preferably two major surfaces of a wood substrate as an anti-grain puffing coating, which significantly reduces or eliminates the grain puffing of the wood substrate caused by the subsequent aqueous coating composition.

Such an aqueous dispersion of siloxane may be applied to a variety of wood substrates to address the grain puffing problem of wood substrates. The treated wood substrate may be used for applications including, but not limited to, household furniture such as tables, chairs, cabinets and the like; bedroom and bathroom furniture; office furniture; custom furniture such as school and children's furniture, hospital furniture, restaurant and hotel furniture, kitchen cabinets and furniture; interior design panels; indoor and outdoor windows and doors; indoor and outdoor window and door frames; outdoor and indoor wall panels and wood floors.

The following examples describe the present disclosure in more detail, which are for illustrative purposes only, since various modifications and changes will be apparent to those skilled in the art from the scope of the present disclosure. Unless otherwise indicated, all parts, percentages, and ratios reported in the following examples are on a weight basis and all reagents used in the examples are commercially available and may be used without further treatment.

EXAMPLES

Treatment of Wood Substrates

Oak wood boards commercial available from the timber market were dried. A sample of size 15 cm*15 cm*1.5 cm was taken from the dried board and conditioned at a temperature of 25° C. and a relative humidity (RH) of 60% with an air flow rate of 1.8 m/s to constant, where the equilibrium moisture content of the sample was 11%. A strip sander was used to polish the sample by using a sandpaper purchased from 3MT Utility Cloth Sheet 240 and then the polished sample was cleaned with a pressure gun.

Application of Solvent System as a Control

The treated samples were spray coated with colorant 110-4695K (whiskey color) supplied by Valspar and allowed to air dry for 10 minutes. Then, the samples were spray coated with clear sealant (nitro-alkyd) 655-210 supplied by Valspar twice successively, after each application the samples were air-dried for 20 minutes, in an oven at 50° C. for 1 hour, and air-cooled for 30 minutes followed by sanding with 600 #sandpaper available from 3MT Wetordry™ Sheet. Then, the coated sample were further spray coated with clear top coat (nitro-alkyd) 430C54080K supplied by Valspar twice successively, after each application, the samples were air-dried for 20 minutes, in an oven at 50° C. for 1 hour, and air-cooled for 30 minutes followed by polishing using 600 #Sandpaper available from 3MT Wetordry™ Sheet. The total film thickness obtained was 80±5 μm.

Application of Aqueous System as a Control

The treated samples were spray coated with colorant 110-4695K (whiskey color) supplied by Valspar and allowed to air dry for 10 minutes. Then, the samples were spray coated with acrylics sealant 470C4015K supplied by Valspar twice successively, after each application the samples were air-dried for 20 minutes, in an oven at 50° C. for 1 hour, and air-cooled for 30 minutes followed by sanding with 600 #sandpaper available from 3MT Wetordry™ Sheet. Then, the coated sample were further spray coated with acrylics varnish 481CS4086K supplied by Valspar twice successively, after each application, the samples were air-dried for 20 minutes, in an oven at 50° C. for 1 hour, and air-cooled for 30 minutes followed by polishing using 600 #Sandpaper available from 3MT Wetordry™ Sheet. The total film thickness obtained was 80±5 μm.

Application of Aqueous Systems According to the Present Invention

The treated samples were spray coated with Dynasylan® Hydrosil 2627 (an aqueous dispersion of siloxane) commercially available from Evonik Germany to form a water-based barrier and air-dried for 20 minutes in an oven at 50° C. for 1 hour, and air-cooled for 30 minutes, followed by polishing by using 240 #sandpaper purchased from 3MT Utility Cloth Sheet, and cleaning with a pressure gun. The coated samples were spray coated with colorant 110-4695K (whiskey color) supplied by Valspar and allowed to air dry for 10 minutes. Then, the samples were spray coated with acrylics sealant 470C4015K supplied by Valspar twice successively, after each application the samples were air-dried for 20 minutes, in an oven at 50° C. for 1 hour, and air-cooled for 30 minutes followed by sanding with 600 #sandpaper available from 3MT Wetordry™ Sheet. Then, the coated sample were further spray coated with acrylics varnish 481C54086K supplied by Valspar twice successively, after each application, the samples were air-dried for 20 minutes, in an oven at 50° C. for 1 hour, and air-cooled for 30 minutes followed by polishing using 600 #Sandpaper available from 3MT Wetordry™ Sheet. The total film thickness obtained was 80±5 μm.

Characterization of Surface Performance

The surface of sample was imaged in dark field mode by light microscopy. The microscope used was a Keyence VHX-S000 with a Z1000 lens.

The effects of solvent system and water-based system on the surface morphology and surface roughness were measured. The 3D surface image of the coated wood substrate was measured. Rough parameters defined in ISO 25178 were calculated from the height distribution in a small area of 5 mm*5 mm and averaged. Before calculating the surface roughness, the slope and shape of the image were calibrated by fitting a 2-level polynomial.

It can be seen from the results of the surface roughness that the articles of the present disclosure have significantly lower surface roughness (only 30 microns), compared to that of the article without the anti-grain puffing coating of aqueous siloxane dispersion of siloxane with a surface roughness of up to 102 microns. Moreover, the surface roughness of the article according to the present invention is comparable to the surface roughness of articles obtained using solvent systems.

Although the present disclosure has been described with reference to numerous embodiments and examples, those of ordinary skill in the art will recognize from the present disclosure that other embodiments can be devised without departing from the scope and spirit of the invention.

What is claimed is:

1. An article comprising
   (a) a wood substrate having at least one major surface;
   (b) an anti grain puffing coating directly applied on the major surface of the wood substrate, formed from an aqueous dispersion of a siloxane; and
   (c) one or more coatings applied on the anti grain puffing coating, formed from an aqueous coating composition,
   wherein the siloxane has the following structure:

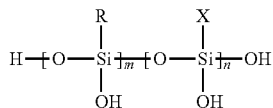

in which
   R represents independently, at each occurrence, optionally substituted C1-C20 alkyl or C6-C10 aryl;
   X represents independently, at each occurrence, a hydrophilic group;
   m is an integer of greater than or equal to 1 and less than 50,
   n is an integer of greater than or equal to 1 and less than 50, and
   the sum of m and n is an integer of greater than or equal to 2;
   wherein the siloxane contains one or more hydrophobic group and one or more hydrophilic group chemically bonded to its molecule skeleton;
   wherein the siloxane has a particle size in the range of 5 to 100 nm; and
   wherein the siloxane comprises a mixture of the siloxane and the mixture has a ratio of m to n in the range of 0.8:1 to 1.2:1.

2. The article as claimed in claim 1, wherein the aqueous dispersion has a viscosity of 100 mPa·s or less at 25° C.

3. The article as claimed in claim 1, wherein the hydrophilic group comprises an amino functional group or an acid functional group selected from the group consisting of the functional groups of carboxylic acid, sulfuric acid, phosphoric acid, sulfonic acid, phosphorous acid, phosphonic acid, or salt thereof.

4. The article as claimed in claim 3, wherein the hydrophilic group is selected from the group consisting of an amino $C_{1-8}$ alkyl group and a carboxyl $C_{1-8}$ alkyl group.

5. The article as claimed in claim 1, wherein the R is selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, octadecyl and eicosyl, preferably substituted with halogen, more preferably with F.

6. The article of claim 1, wherein the wood substrate comprises a soft wood substrate, a hard wood substrate or any combination thereof;
   wherein the soft wood substrate comprises pine, cedar or fir; and
   wherein the hard wood substrate comprises ashtree, white ash, basswood, elm, maple, birch, alder, beech, oak, rubber wood, cherry, walnut, or rosewood.

7. The article of claim 1, wherein the coatings comprise a primer coating, an intermediate coating, a topcoat coating or any combination thereof.

8. The article of claim 1, wherein the aqueous coating composition is selected from the group consisting of a water soluble coating composition and a water dispersible coating composition.

9. The article as claimed in claim 8, wherein the water dispersible coating composition contains an aqueous dispersion of organic silicone, styrene-acrylate, acrylate, organic silicone-modified acrylate, vinyl acetate, vinyl acetate-acrylate, vinyl acetate-ethylene, vinyl acetate-acrylate-esters of versatic acid, polyurethane, acrylate-polyurethane or any combination thereof.

10. The article as claimed in claim 8, wherein the water soluble coating composition contains polyvinyl alcohol.

11. An aqueous dispersion for reducing grain puffing of a wood substrate, comprising siloxane,
    wherein the siloxane has the following structure:

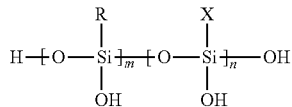

in which
    R represents independently, at each occurrence, optionally substituted C1-C20 alkyl or C6-C10 aryl;
    X represents independently, at each occurrence, a hydrophilic group;
    m is an integer of greater than or equal to 1 and less than 50,
    n is an integer of greater than or equal to 1 and less than 50, and
    the sum of m and n is an integer of greater than or equal to 2;
    wherein the siloxane contains one or more hydrophobic group and one or more hydrophilic group chemically bonded to its molecule skeleton;
    wherein the siloxane has a particle size in the range of 5 to 100 nm; and
    wherein the siloxane comprises a mixture of siloxane, and the mixture has a ratio of m to n is in the range of 0.8:1 to 1.2:1.

12. The aqueous dispersion of claim 11, wherein the aqueous dispersion has a viscosity of 100 mPa·s or less at 25° C.

* * * * *